(12) United States Patent
Uno et al.

(10) Patent No.: US 11,118,043 B2
(45) Date of Patent: Sep. 14, 2021

(54) CROSSLINKED POLYOLEFIN RESIN FOAM, AND MOLDED ARTICLE USING SAME

(71) Applicant: SEKISUI CHEMICAL CO., LTD., Osaka (JP)

(72) Inventors: Takumei Uno, Shiraoka (JP); Yukihiro Sugie, Shiraoka (JP); Hiroki Mikami, Koga (JP); Hajime Takasugi, Hasuda (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 23 days.

(21) Appl. No.: 16/088,932

(22) PCT Filed: Mar. 30, 2017

(86) PCT No.: PCT/JP2017/013349
§ 371 (c)(1),
(2) Date: Sep. 27, 2018

(87) PCT Pub. No.: WO2017/170907
PCT Pub. Date: Oct. 5, 2017

(65) Prior Publication Data
US 2019/0119479 A1 Apr. 25, 2019

(30) Foreign Application Priority Data
Mar. 31, 2016 (JP) .............................. JP2016-071613

(51) Int. Cl.
| | |
|---|---|
| *C08L 23/16* | (2006.01) |
| *B32B 27/32* | (2006.01) |
| *B32B 5/18* | (2006.01) |
| *C08L 23/14* | (2006.01) |
| *C08J 9/00* | (2006.01) |
| *C08J 9/34* | (2006.01) |
| *C08F 210/16* | (2006.01) |
| *C08L 23/08* | (2006.01) |

(52) U.S. Cl.
CPC ............... *C08L 23/16* (2013.01); *B32B 5/18* (2013.01); *B32B 27/32* (2013.01); *C08F 210/16* (2013.01); *C08J 9/0061* (2013.01); *C08J 9/34* (2013.01); *C08L 23/0815* (2013.01); *C08L 23/14* (2013.01); *C08F 2500/08* (2013.01); *C08F 2500/17* (2013.01); *C08F 2810/20* (2013.01); *C08J 2201/026* (2013.01); *C08J 2201/03* (2013.01); *C08J 2323/14* (2013.01); *C08J 2323/16* (2013.01); *C08J 2423/14* (2013.01); *C08J 2423/16* (2013.01); *C08L 2203/14* (2013.01); *C08L 2312/00* (2013.01)

(58) Field of Classification Search
CPC . C08L 23/16; C08J 2201/026; C08J 2323/12; C08J 2323/16; C08J 2205/06; C08J 2423/14
See application file for complete search history.

(56) References Cited

U.S. PATENT DOCUMENTS

| | | | |
|---|---|---|---|
| 6,521,705 B1 * | 2/2003 | Sugimoto | ................. B32B 5/18 525/98 |
| 6,569,915 B1 * | 5/2003 | Jackson | ................. C08L 23/10 522/112 |
| 2008/0262116 A1 * | 10/2008 | Simpson | ................. C08J 9/0061 521/50.5 |
| 2016/0208060 A1 * | 7/2016 | Nishiguchi | .............. C08J 3/226 |

FOREIGN PATENT DOCUMENTS

| | | |
|---|---|---|
| CN | 102464831 | 5/2012 |
| JP | 2000-26640 | 1/2000 |
| JP | 2003-183435 | 7/2003 |
| JP | 2005-350571 | 12/2005 |
| JP | 2005-5350571 | * 12/2005 |
| JP | 2008-266589 | 11/2008 |
| JP | 2009-235329 | 10/2009 |
| JP | 2013-67818 | 4/2013 |
| WO | 2016/052555 | 4/2016 |

OTHER PUBLICATIONS

International Search Report dated Jul. 4, 2017 in International (PCT) Application No. PCT/JP2017/013349.

* cited by examiner

*Primary Examiner* — Gregory Listvoyb
(74) *Attorney, Agent, or Firm* — Wenderoth, Lind & Ponack, L.L.P.

(57) ABSTRACT

The crosslinked polyolefin resin foam of the present invention is a crosslinked polyolefin resin foam obtained by crosslinking and foaming a polyolefin resin composition comprising a polypropylene resin and an olefin rubber; the olefin rubber having a Mooney viscosity ($ML_{1+4}$, 100° C.) of 15 to 85; the olefin rubber being contained in an amount of 10 to 150 parts by mass relative to 100 parts by mass of the polypropylene resin; the foam having a 25% compressive hardness of 30 to 70 kPa and a compressive strength ratio, 25% compressive strength/5% compressive strength, of 2.0 to 4.5. According to the present invention, a crosslinked polyolefin resin foam from which a molded product excellent in appearance can be obtained even in a secondary processing to a complicated shape without impairment of flexibility, and a molded product made from the same are provided.

6 Claims, No Drawings

US 11,118,043 B2

CROSSLINKED POLYOLEFIN RESIN FOAM, AND MOLDED ARTICLE USING SAME

TECHNICAL FIELD

The present invention relates to a crosslinked polyolefin resin foam for use as materials for vehicle interior and the like, and a molded product made from the same.

BACKGROUND ART

Crosslinked polyolefin resin foams are generally excellent in flexibility, weight saving and insulation, and widely used for laminates with a skin material, insulators, cushions, etc. In an automobile field, in particular, the foams are used as materials for vehicle interior including a ceiling, a door, and an instrument panel.

In order to produce materials for vehicle interior, a resin sheet made of polyvinylchloride, thermoplastic elastomer, or the like as skin material is typically laminated on one surface of a sheet-like crosslinked polyolefin resin foam to make a laminate, which is then subjected to secondary processing by vacuum molding, compression molding, etc., to impart a predetermined shape, thus made into a product.

Meanwhile, due to the recent diversification or sophistication of preferences, materials for vehicle interior also are required to have complicated shapes with an improved productivity. In the secondary processing of a resin foam, wrinkles and the like, therefore, tend to easily occur in the surface of a foam, resulting in increased appearance defects. Accordingly, improvement in the resin material is required to solve the appearance defects, while maintaining the flexibility of the resin foam.

For example, there is disclosed in PTL1 a crosslinked polyolefin resin foam containing 25 to 50 parts by weight of a thermoplastic elastomer relative to 100 parts by weight of a polyolefin resin composition including a polypropylene resin having at least one DSC endothermic peak of 160° C. or higher and a polyethylene resin, the resin foam having an apparent density of 50 to 100 kg/m³ and a gel fraction of 45% or more.

CITATION LIST

Patent Literature

PTL1: JP 2008-266589 A

SUMMARY OF INVENTION

Technical Problem

As described in PTL1, the addition of a thermoplastic elastomer to a polyolefin resin material enhances the flexibility of a foam but worsens the molding properties in secondary processing of the foam. Accordingly, in order to improve the molding properties, increasing the crosslinking degree of the entire foam and blending a polypropylene resin having a high melting point have been attempted.

However, the improvement of molding properties by increasing the crosslinking degree of the entire foam or by blending a high-melting point resin impairs the flexibility of the foam. As a result, the molded product has worsened texture and appearance, which is problematic.

It is an object of the present invention, in view of these circumstances, to provide a crosslinked polyolefin resin foam from which a molded product excellent in appearance can be obtained even in a secondary processing to a complicated shape without impairment of the flexibility, and a molded product made from the same.

Solution to Problem

Through extensive investigation, the present inventor has found that a crosslinked polyolefin resin foam excellent in flexibility and molding properties can be obtained by crosslinking and foaming a polyolefin resin composition comprising a polypropylene resin and a specific amount of an olefin rubber having a specific Mooney viscosity such that the compressive hardness is controlled in a specific range. The present invention has been thus accomplished.

Specifically, the present invention provides the following [1] to [7].

[1] A crosslinked polyolefin resin foam obtained by crosslinking and foaming a polyolefin resin composition comprising a polypropylene resin and an olefin rubber, the olefin rubber having a Mooney viscosity ($ML_{1+4}$, 100° C.) of 15 to 85, the olefin rubber being contained in an amount of 10 to 150 parts by mass relative to 100 parts by mass of the polypropylene resin, the foam having a 25% compressive hardness of 30 to 70 kPa and a compressive strength ratio, 25% compressive strength/5% compressive strength, of 2.0 to 4.5.

[2] The crosslinked polyolefin resin foam according to item [1], wherein the crosslinking degree of the whole is 30 to 65%.

[3] The crosslinked polyolefin resin foam according to item [1] or [2], wherein the polypropylene resin is an ethylene-propylene random copolymer.

[4] The crosslinked polyolefin resin foam according to any one of items [1] to [3], wherein the olefin rubber is an ethylene-α-olefin copolymer rubber.

[5] A molded product obtained by molding the crosslinked polyolefin resin foam according to any one of items [1] to [4].

[6] The molded product according to item [5], having a skin material laminated on the crosslinked polyolefin resin foam so as to be integrated.

[7] The molded product according to item [5] or [6] for use as material for vehicle interior.

Advantageous Effects of Invention

According to the present invention, a crosslinked polyolefin resin foam from which a molded product excellent in flexibility and appearance can be obtained even in a secondary processing to a complicated shape, and a molded product made from the same, can be provided.

DESCRIPTION OF EMBODIMENTS

The crosslinked polyolefin resin foam of the present invention is a crosslinked polyolefin resin foam obtained by crosslinking and foaming a polyolefin resin composition comprising a polypropylene resin and an olefin rubber, the olefin rubber having a Mooney viscosity ($ML_{1+4}$, 100° C.) of 15 to 85, the olefin rubber being contained in an amount of 10 to 150 parts by mass relative to 100 parts by mass of the polypropylene resin, the foam having a 25% compressive hardness of 30 to 70 kPa and a compressive strength ratio, 25% compressive strength/5% compressive strength, of 2.0 to 4.5.

Each of the components for use in the crosslinked polyolefin resin foam of the present invention will be described below.

[Crosslinked Polyolefin Resin Foam]

The crosslinked polyolefin resin foam of the present invention is made by crosslinking a polyolefin resin composition comprising a polypropylene resin and an olefin rubber (hereinafter also referred to as "resin composition (a)") and causing the composition to foam.

[Polypropylene Resin]

Examples of the polypropylene resin include a propylene homopolymer (homopolypropylene) and a copolymer of propylene and another olefin, though not particularly limited. Although the copolymer of propylene and another olefin may be any one of a block copolymer, a random copolymer, and a random block copolymer, a random copolymer (random polypropylene) is preferred.

Examples of the other olefin to be copolymerized with propylene include an α-olefin such as ethylene, 1-butene, 1-pentene, 4-methyl-1-pentene, 1-hexene, 1-octene, 1-nonene and 1-decene. Among them, ethylene is preferred. In other words, an ethylene-propylene random copolymer is preferred as the polypropylene resin.

The copolymer of propylene and another olefin typically contains propylene in an amount of 90 to 99.5 weight % and an α-olefin other than propylene in an amount of 0.5 to 10 mass %, preferably contains propylene in an amount of 95 to 99 weight % and an α-olefin other than propylene in an amount of 1 to 5 mass %

The polypropylene resin has a melt flow rate (hereinafter also referred to as "MFR") of, preferably 0.4 to 4.0 g/10 min, more preferably 0.5 to 2.5 g/10 min. Use of the polypropylene resin having the MFR in the range tends to provide favorable molding properties in processing the resin composition (a) to a foam and favorable molding properties in secondary processing of the foam.

The polypropylene resins may be used singly or may be used in combination of two or more.

[Olefin Rubber]

The olefin rubber for use has a Mooney viscosity ($ML_{1+4}$, 100° C.) of 15 to 85. With a Mooney viscosity in the above range, the flexibility and the molding properties can be improved in a good balance. In order to further improve the flexibility and the molding properties, the Mooney viscosity of the olefin rubber is preferably 25 to 75, more preferably 30 to 70.

As the olefin rubber, an amorphous or low-crystalline rubber material substantially randomly copolymerized from two or more olefin monomers is preferred, and an ethylene-α-olefin copolymer rubber is more preferred from the viewpoint of improving the molding properties and the flexibility in a good balance.

Examples of the α-olefin for use in the ethylene-α-olefin copolymer rubber include one or a plurality of α-olefins having 3 to 15 carbon atoms, preferably 3 to 10 carbon atoms, such as propylene, 1-butene, 2-methylpropylene, 3-methyl-1-butene, 1-pentene, 1-hexene, 4-methyl-1-pentene, and 1-octene. In particular, propylene and 1-butene are preferred, and propylene is more preferred.

The ethylene-α-olefin copolymer rubber may contain another monomer unit in addition to an ethylene unit and an α-olefin unit.

Examples of the monomer to form the monomer unit include a conjugated diene having 4 to 8 carbon atoms such as 1,3-butadiene, 2-methyl-1,3-butadiene (isoprene), 1-3-pentadiene, and 2,3-dimethyl-1,3-butadiene; a nonconjugated diene having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; a vinyl ester compound such as vinyl acetate; an unsaturated carboxylate such as methyl acrylate, ethyl acrylate, butyl acrylate, methyl methacrylate, and ethyl methacrylate; and an unsaturated carboxylic acid such as acrylic acid and methacrylic acid. The monomers may be used singly or may be used in combination of two or more. In particular, a nonconjugated diene having 5 to 15 carbon atoms is preferred, and 5-ethylidene-2-norbornene, 1,4-hexadiene, and dicyclopentadiene (DCPD) are more preferred from the viewpoint of easy availability.

In an ethylene-α-olefin copolymer rubber, the content of ethylene unit is typically 30 to 85 mass %, preferably 40 to 80 mass %, more preferably 45 to 75 mass %; the content of α-olefin unit having 3 to 15, preferably 3 to 10, carbon atoms, such as propylene, is typically 10 to 60 wt %, preferably 15 to 50 wt %; and the content of other monomer units such as nonconjugated diene is typically 0 to 20 wt %, preferably 1 to 10 wt %.

Preferred examples of the ethylene-α-olefin copolymer rubber include a thermoplastic olefin elastomer (TPO). Any of a blended, a dynamic crosslinked, and a polymerized thermoplastic olefin elastomer may be used as the thermoplastic olefin elastomer. More specifically, examples thereof include: a copolymer having polypropylene as hard segment, ethylene as soft segment, and a small amount of diene components on an as needed basis, such as an ethylene-propylene copolymer (EPR) and an ethylene-propylene-diene copolymer (EPDM); a blended product of polyethylene and EPR; a blended product of polyethylene and EPR partially crosslinked using an organic peroxide; a blended product of polyethylene and EPR graft-modified with an unsaturated hydroxyl monomer, a derivative of unsaturated carboxylic acid, or the like; and a butyl-grafted polyethylene.

In particular, EPR and EPDM are preferred, EPDM is more preferred, an ethylene-propylene-5-ethylidene-2-norbornene copolymer and an ethylene-propylene-dicyclopentadiene copolymer are more preferred, and an ethylene-propylene-dicyclopentadiene copolymer is further more preferred.

The thermoplastic olefin elastomer has an MFR of preferably 0.8 to 5.0 g/10 min, more preferably 1.5 to 4.0 g/10 min. Use of the thermoplastic olefin elastomer having an MFR in the above range tends to provide favorable molding properties in processing the resin composition (a) to a foam and favorable molding properties in secondary molding of the foam.

The ethylene-α-olefin copolymer rubber can be obtained by a known polymerization method. Examples of the polymerization method include polymerization in an inert solvent such as hexane, heptane, toluene, xylene, or the like with use of a polymerization catalyst such as Ziegler-Natta catalyst and a metallocene catalyst.

The olefin rubbers may be used singly or may be used in combination of two or more.

[Other Components]

The resin composition (a) may be composed of a polypropylene resin and an olefin rubber only, and may comprise other resin components as long as the object of the present invention is not impeded.

Examples of the resin components include a polyethylene resin, an ethylene-vinyl acetate copolymer, an ethylene-acrylic acid copolymer, an ethylene-alkyl(meth)acrylate copolymer, and modified copolymers produced by copolymerizing the above-mentioned compounds with maleic anhydride.

<Compounding of Resin Composition (a)>

The resin composition (a) has a content of polypropylene resin of preferably 40 mass % or more, more preferably 45 mass % or more, and preferably 90 mass % or less, more preferably 80 mass % or less, still more preferably 70 mass % or less, relative to the total resin content in the resin composition (a).

The crosslinked polyolefin resin foam having a polypropylene resin as main component allows the mechanical strength, the heat resistance, etc., of the foam to be excellent. As described above, the polypropylene resin is preferably a random polypropylene.

In the resin composition (a), the olefin rubber content is 10 to 150 parts by mass relative to 100 parts by mass of the polypropylene resin. With the content of less than 10 parts by mass, the flexibility of a foam decreases despite the adjustment of the crosslinking degree as described below. With a content of more than 150 parts by mass, the mechanical strength of a foam is reduced and problems such as the occurrence of wrinkles during the second molding are easily caused. From the viewpoint of improving the flexibility and the molding properties in a good balance, the olefin rubber content is preferably 40 parts by mass or more, more preferably 50 parts by mass or more, still more preferably 60 parts by mass or more, and preferably 140 parts by mass or less, more preferably 120 parts by mass or less, still more preferably 110 parts by mass or less, relative to 100 parts by mass of the polypropylene resin.

In the case of the resin composition (a) consisting of a polypropylene resin and an olefin rubber, the olefin rubber content is preferably less than 60 mass %, more preferably less than 55 mass %, and preferably more than 10 mass %, more preferably more than 20 mass %, still more preferably more than 30 mass %, relative to the total resin content in the resin composition (a).

The resin composition (a) may further comprise another resin such as a polyethylene resin in addition to the polypropylene resin and the olefin rubber, as long as the object of the present invention is not impeded.

In the case of the resin composition (a) comprising another resin such as a polyethylene resin, the content is preferably 30 parts by mass or less, more preferably 20 parts by mass or less, relative to 100 parts by mass of the polypropylene resin.

<Additive>

The resin composition (a) for use in the present invention typically contains a foaming agent as additive other than the resin components, and preferably contains one or both of a crosslinking aid and an antioxidant.

(Foaming Agent)

Foaming of the resin composition (a) may be caused by a chemical foaming method or a physical foaming method. In a chemical foaming method, a compound added to the resin composition (a) is thermally decomposed to generate a gas, which produces bubbles. In a physical foaming method, the resin composition (a) is impregnated with a liquid having a low boiling point (foaming agent) and the foaming agent is then volatilized to produce cells. Although the foaming method is not particularly limited, a chemical foaming method is preferred from the viewpoint of obtaining a foam having closed cells in a uniform manner.

A thermally decomposable foaming agent can be used as foaming agent. For example, an organic or inorganic chemical foaming agent can be used, having a decomposition temperature of about 160° C. to 270° C.

Examples of the organic foaming agent include: an azo compound such as azodicarbonamide, a metal azodicarboxylate (e.g. barium azodicarboxylate), and azobisisobutyronitrile; a nitroso compound such as N,N'-dinitrosopentamethylenetetramine; a hydrazine derivative such as hydrazodicarbonamide, 4,4'-oxybis(benzenesulfonyl hydrazide), and toluenesulfonyl hydrazide; and a semicarbazide compound such as toluenesulfonyl semicarbazide.

Examples of the inorganic foaming agent include an acid ammonium, sodium carbonate, ammonium hydrogen carbonate, sodium hydrogen carbonate, ammonium nitrite, sodium borohydride, and monosodium citrate anhydrate.

In particular, from the viewpoint of obtaining fine bubbles and the viewpoint of economic efficiency and safety, an azo compound and a nitroso compound are preferred; azodicarbonamide, azobisisobutyronitrile, and N,N'-dinitrosopentamethylenetetramine are more preferred; and azodicarbonamide is particularly preferred.

The foaming agents may be used singly or may be used in combination of two or more.

From the viewpoint of proper foaming without burst of bubbles in a foam, the addition amount of a thermally decomposable foaming agent is preferably 1 to 30 parts by mass, more preferably 2 to 15 parts by mass, relative to 100 parts by mass of the resin components.

(Crosslinking Aid)

A multi-functional monomer may be used as crosslinking aid. Examples thereof include: a tri-functional (meth)acrylate compound such as trimethyrolpropane trimethacrylate and trimethyrolpropane triacrylate; a compound having three functional groups in a molecule such as trimellitic acid triallyl ester, 1,2,4-benzenetricarboxylic acid triallyl ester, and triallyl isocyanurate; a bi-functional (meth)acrylate compound such as 1,6-hexanediol dimethacrylate, 1,9-nonanediol dimethacrylate, 1,10-decanediol dimethacrylate, and neopentyl glycol dimethacrylate; a compound having two functional groups in a molecule such as divinylbenzene; diallylphthalate, diallylterephthalate, diallylisophthalate, ethylvinylbenzene, laurylmethacrylate, and stearylmethacrylate. Among them, tri-functional (meth)acrylate compound is more preferred.

The crosslinking aid may be used singly or may be used in combination of two or more.

The addition of a crosslinking aid to a resin composition (a) allows the resin composition (a) to be crosslinked with a smaller dose of ionizing radiation. As a result, the individual resin molecule is prevented from being cut or deteriorated by the exposure to ionizing radiation.

The content of the crosslinking aid is preferably 0.2 to 20 parts by mass, more preferably 0.5 to 15 parts by mass, relative to 100 parts by mass of the resin composition (a), from the viewpoint of easiness of adjustment or control of the crosslinking degree in foaming of the resin composition (a).

(Antioxidant)

Examples of the antioxidant include a phenol antioxidant, a sulfur antioxidant, a phosphorus antioxidant, an amine antioxidant. Among them a phenol antioxidant and a sulfur antioxidant are preferred, and use of a phenol antioxidant and a sulfur antioxidant in combination is more preferred.

Examples of the phenol antioxidant include 2,6-di-tert-butyl-p-cresol, n-octadecyl-3-(3,5-di-tert-butyl-4-hydroxyphenyl)propionate, 2-tert-butyl-6-(3-tert-butyl-2-hydroxy- 5-methylbenzyl)-4-methylphenylacrylate, tetrakis [methylene-3-(3,5-di-tert-butyl-4-hydroxyphenyl) propionate]methane.

Examples of the sulfur antioxidant include dilauryl thiodipropionate, dimyristyl thiodipropionate, distearyl thiodipropionate, pentaerythrityl tetrakis(3-lauryl thiopropionate).

The antioxidants may be used singly or may be used in combination of two or more.

The content of the antioxidant is preferably 0.1 to 10 parts by mass, more preferably 0.2 to 5 parts by mass, relative to 100 parts by mass of the resin composition (a).

On an as needed basis, the resin composition (a) may contain an additive other than the above-described ones such as an agent for adjusting decomposition temperature such as zinc oxide, zinc stearate and urea, a flame retardant, a metal toxicity inhibitor, an antistatic agent, a stabilizer, a filler, and a pigment.

[Crosslinked Polyolefin Resin Foam]

The crosslinked polyolefin resin foam of the present invention (hereinafter also referred to simply as "foam") is obtained by crosslinking and foaming the resin composition (a) described above.

(Density)

The density (apparent density) of the foam is preferably 0.03 g/cm$^3$ or more, more preferably 0.032 g/cm$^3$ or more, still more preferably 0.035 g/cm$^3$ or more, and preferably 0.12 g/cm$^3$ or less, more preferably 0.11 g/cm$^3$ or less, still more preferably 0.10 g/cm$^3$ or less, from the viewpoint of improving the flexibility and the mechanical strength in a good balance.

(Expansion Ratio)

The expansion ratio of the foam, which is calculated as the reciprocal of density, is preferably 8 cm$^3$/g or more, more preferably 9 cm$^3$/g or more, still more preferably 10 cm$^3$/g or more, and preferably 33 cm$^3$/g or less, more preferably 31 cm$^3$/g or less, still more preferably 29 cm$^3$/g or less, from the viewpoint of having improved flexibility and the mechanical strength in a good balance.

(Crosslinking Degree)

The crosslinking degree (mass %) of the entire foam is preferably 30% or more, more preferably 35% or more, still more preferably 40% or more, and preferably 65% or less, more preferably 60% or less, still more preferably 55% or less, from the viewpoint of improving the flexibility, the mechanical strength, and the molding properties in a good balance.

The method for measuring the crosslinking degree will be described in Examples later.

(Thickness)

The thickness of the foam is preferably 0.5 mm or more, more preferably about 0.8 mm or more, still more preferably 1.2 mm or more, and preferably 8 mm or less, more preferably 6 mm or less, still more preferably 5 mm or less. With a thickness of the foam in these ranges, both of the flexibility and the molding properties can be easily improved, so that the foam can be easily molded into materials for vehicle interior.

(25% Compressive Hardness)

The 25% compressive hardness of the foam is preferably 30 to 70 kPa, more preferably 35 to 65 kPa, still more preferably 40 to 60 kPa, from the viewpoint of securing the mechanical strength and the like.

(Compressive Strength Ratio, 25% Compressive Strength/5% Compressive Strength)

The compressive strength ratio, 25% compressive strength/5% compressive strength, of the foam is 2.0 to 4.5, preferably 2.2 to 4.0, still more preferably 2.3 to 3.8, from the viewpoint of securing the flexibility.

The 25% compressive hardness, the 25% compressive strength, and the 5% compressive strength are measured in accordance with JIS K6767.

<Manufacturing Method of Foam>

The foam can be manufactured by, for example, melt-kneading the resin composition (a) so as to mold into a desired shape, then irradiating the resin composition (a) with ionizing radiation so as to crosslink the resin composition, and causing the composition to foam by heating.

Specifically, a manufacturing method having the following steps 1 to 3 is more preferred:

Step 1: Melt-kneading each of the components to constitute the resin composition (a), and then obtaining the resin composition (a) in a predetermined shape such as a sheet form.

Step 2: Irradiating the resin composition (a) obtained in the step 1 with ionizing radiation so as to crosslink the resin composition.

Step 3: Heating the resin composition (a) crosslinked in the step 2 at the decomposition temperature of the thermally decomposable foaming agent or higher so as to obtain a foam.

In the step 1, each of the components to constitute the resin composition (a) is supplied to a kneader so as to be melt-kneaded at a temperature lower than the decomposition temperature of the thermally decomposable foaming agent, and then molding the melt-kneaded resin composition (a) into a desired shape such as a sheet form preferably by the kneader used in the melt-kneading.

Examples of the kneader for use include a general-purpose kneader such as an injection molding machine, an extruder such as a mono-axial extruder and a bi-axial extruder, a Banbury mixer, and rolls. Among them, an injection molding machine and an extruder are preferred. With use of an injection molding machine, the manufacturing can be efficiently performed.

The resin temperature inside an injection molding machine or an extruder is preferably 120 to 220° C., more preferably 140 to 200° C., still more preferably 150 to 195° C.

In the step 2, the resin composition (a) molded into a desired shape is irradiated with ionizing radiation.

Examples of the ionizing radiation include electron beam, α ray, β ray, and γ ray, and X-ray. Among them, electron beam is preferred from the view point of productivity and achieving uniform irradiation.

In the case of a resin composition (a) molded to a sheet, for example, only one surface or both surfaces of the sheet may be irradiated with the ionizing radiation.

The accelerating voltage of the ionizing radiation depends on the thickness of a foam resin composition to be irradiated. In the case of a composition with a thickness of 1.5 to 8 mm, for example, the accelerating voltage is preferably 400 to 1200 kV, more preferably 500 to 1100 kV, still more preferably 600 to 1000 kV.

The typical dose of irradiation of the ionizing radiation is preferably 0.1 to 10 Mrad, more preferably 0.2 to 5 Mrad, still more preferably 0.3 to 3 Mrad, which may be determined so as to provide a desired crosslinking degree without occurrence of a roughened surface, cracks, or the like, considering the thickness of the foam resin composition to be irradiated.

In the step 3, the resin composition (a) crosslinked with irradiation of an ionizing radiation as described above is heated at the decomposition temperature of the foaming agent or higher for foaming of the resin composition (a), so that a foam can be obtained through foaming and molding at the same time.

The temperature for foaming of the resin composition (a) by heating is typically 140 to 300° C., preferably 150 to 280° C., more preferably 160 to 260° C., depending on the decomposition temperature of the thermally decomposable foaming agent for use as foaming agent. The foam sheet may be stretched in one or both of the MD direction and the CD direction during or after foaming.

The foam of the present invention preferably has a closed-cell structure, though the closed-cell structure may include open-cells.

[Molded Product]

The molded product of the present invention is obtained by molding the crosslinked polyolefin resin foam of the present invention by a known molding method. In manufacturing the molded product, other materials such as a substrate and a skin material may be bonded together to make a laminate.

As the substrate to make the framework of a molded product, a thermoplastic resin is typically used. Examples of the thermoplastic resin for use as substrate include the polyolefin resin, a copolymer of ethylene and an α-olefin, vinyl acetate, or an acrylate, an ABS resin, and a polystyrene resin.

Examples of the skin material include: a polyvinyl chloride sheet; a mixed resin sheet of polyvinyl chloride and ABS resin; a thermoplastic elastomer sheet; a textile, a knitted product, and a nonwoven fabric made from natural fiber or man-made fiber; and leather such as artificial leather and synthetic leather. A composite molded product having a lenticel or grain pattern on the surface may be manufactured with use of a silicone stamper having an uneven pattern transferred from real leather, a stone or a wood.

Examples of the method for laminating a skin material on the surface include an extrusion lamination method, an adhesion lamination method including successive steps of adhesive application and lamination, a thermal lamination method (heat seal method), a hot melt method, and a high-frequency welding method, any of which can be employed as long as the skin material can be bonded to the surface.

Examples of the molding method of the molded product of the present invention include stamping molding, vacuum molding, compression molding and injection molding. Among them, stamping molding and vacuum molding are preferred. The vacuum molding includes molding over a male mold and molding in a female mold, any one of which may be used. The vacuum molding over a male mold is more preferred, though.

The molded product made from the laminated foam sheet of the present invention can be used as an insulator, a cushion, and the like, and can be preferably used in an automobile field as materials for vehicle interior such as a ceiling material, a door, and an instrument panel.

EXAMPLES

The present invention will be further described in detail with reference to Examples below. The present invention is not limited to Examples, though.

The method for measuring each of the physical properties and the method for evaluating a foam sheet are as follows.

(1) MFR

The MFR value was measured under conditions with a temperature of 230° C. and a load of 2.16 kgf for polypropylene resin, with a temperature of 190° C. and a load of 2.16 kgf for polyethylene resin, and with a temperature of 230° C. and a load of 2.16 kgf for thermoplastic olefin elastomer, in accordance with JIS K7210.

(2) Mooney Viscosity ($ML_{1+4}$, 100° C.)

The Mooney viscosity ($ML_{1+4}$, 100° C.) was measured in accordance with JIS K6300-1.

(3) Density and Expansion Ratio of Foam

The density (apparent density) of a foam was measured in accordance with JIS K7222.

The expansion ratio was calculated as the reciprocal of the obtained density.

(4) Crosslinking Degree

A test piece of about 100 mg was sampled from a foam sheet, and the mass A (mg) of the test piece was accurately measured. Subsequently the test piece was immersed in 30 cm$^3$ of xylene at 120° C. and left standing for 24 hours. The resulting xylene was then filtered with a 200-mesh metal screen, and insoluble components on the metal mesh were collected and vacuum-dried. The mass B (mg) of the insoluble components was accurately measured. The crosslinking degree (mass %) was calculated from the resulting value based on the following formula.

$$\text{Crosslinking degree (mass \%)} = (B/A) \times 100$$

(5) Thickness of Foam

A dial gauge was used for the measurement.

(6) 25% Compressive Hardness

The measurement was performed in accordance with JIS K6767.

(7) Compressive Strength Ratio [(25% Compressive Strength)/(5% Compressive Strength)]

The ratio was calculated from the 25% compressive strength and the 5% compressive strength measured in accordance with JIS K6767.

(8) Flexibility

The flexibility was determined based on the following criteria.

(Criteria)

A: Having excellent flexibility and sufficient mechanical strength, with a 25% compressive hardness of 30 to 70 kPa.

B: Having flexibility with no problem in practical use.

C: Having poor flexibility with problems in practical use.

(9) Molding Properties

The foam obtained in each of Examples and Comparative Examples was molded to a box-shape molded product under conditions with a surface temperature of 140° C. by a vacuum molding machine. The surface of the molded product was visually observed to determine whether wrinkles were present.

Examples 1 to 3, and Comparative Examples 1 to 3

The resin components and the additives each shown in Table 1 in an amount shown in Table 1 were supplied to a mono-axial extruder, melt-kneaded at a resin temperature of 180° C., and extruded to obtain a resin composition in a sheet form having a predetermined thickness. Both surfaces of the resin composition in a sheet form were irradiated with electron beams, so that the resin composition was crosslinked. Subsequently, the crosslinked resin composition was heated in a hot air oven at 250° C. for 5 minutes so as to cause foaming. A crosslinked polyolefin resin foam having a predetermined thickness was thus obtained. The results are shown in Table 1.

TABLE 1

|  |  |  | Example | | | Comparative Example | | |
| --- | --- | --- | --- | --- | --- | --- | --- | --- |
|  |  |  | 1 | 2 | 3 | 1 | 2 | 3 |
| Resin Composition | Compounded composition (parts by mass) | Random PP | 50 | 50 | 60 | 60 | 60 | 40 |
|  |  | EPDM | 30 | 30 | 20 | — | — | — |
|  |  | TPO | 20 | 20 | 20 | — | — | 40 |
|  |  | LLDPE | — | — | — | 40 | 40 | 20 |
|  |  | Foaming agent | 10 | 6 | 7 | 10 | 6 | 7 |
|  |  | Crosslinking aid | 3 | 3 | 3 | 3 | 3 | 3 |
|  |  | Antioxidant 1 | 0.3 | 0.3 | 0.3 | 0.3 | 0.3 | 0.3 |
|  |  | Antioxidant 2 | 0.3 | 0.3 | 0.3 | 0.3 | 0.3 | 0.3 |
| Extruded sheet |  | Thickness (mm) | 1.3 | 1.6 | 1.6 | 1.3 | 1.6 | 1.6 |
| Crosslinking | Electron beam irradiation | Accelerating voltage (kV) | 800 | 800 | 800 | 800 | 800 | 800 |
|  |  | Irradiation dose (Mrad) | 1.5 | 1.5 | 1.5 | 1.5 | 1.5 | 1.5 |
| Foam | Physical properties | Density (g/cm$^3$) | 0.04 | 0.067 | 0.041 | 0.041 | 0.066 | 0.068 |
|  |  | Expansion ratio (cm$^3$/g) | 25 | 15 | 24 | 24 | 15 | 15 |
|  |  | Crosslinking degree (mass %) | 49 | 47 | 50 | 44 | 47 | 49 |
|  |  | Thickness (mm) | 2.98 | 2.96 | 3.02 | 2.95 | 3.03 | 2.97 |
|  |  | 25% Compressive hardness | 45 | 50 | 55 | 61 | 103 | 43 |
|  |  | Compressive strength ratio *1 | 3.8 | 3.0 | 2.3 | 1.5 | 1.2 | 4.8 |
| Evaluation of foam |  | Flexibility | A | A | A | C | C | A |
|  |  | Occurrence of wrinkles | Absent | Absent | Absent | Absent | Absent | Present |

*1: Ratio of 25% compressive strength/5% compressive strength

The details of the resin components and the additives shown in Table 1 are as follows.

Random PP: ethylene-propylene random copolymer, product name: NOVATEC EG7F, manufactured by Japan Polypropylene Corporation, MFR=1.3 g/10 min, ethylene content: 3 mass %

EPDM: ethylene-propylene-diene copolymer, product name: ESPRENE 301, manufactured by Sumitomo Chemical Co., Ltd., Mooney viscosity (ML$_{1+4}$, 100° C.)=55, ethylene content: 62 mass %, DCPD content: 3 mass %

TPO: thermoplastic olefin elastomer, product name: CAT-ALLOY Q200F, manufactured by Sun Allomer Ltd., MFR=0.8 g/10 min LLDPE: linear low-density polyethylene, product name: 2036P, manufactured by The Dow Chemical Company, MFR=2.5 g/10 min Foaming agent: azodicarbonamide Crosslinking aid: trimethyrol propane trimethacrylate Antioxidant 1: 2,6-di-tert-butyl-p-cresol Antioxidant 2: dilauryl thiodipropionate As described above, in Examples 1 to 3, the resin compositions containing a specific compounding amount of a specific olefin rubber had a 25% compressive hardness of 30 to 70 kPa and a compressive strength ratio, 25% compressive strength/5% compressive strength, of 2.0 to 4.5, so that crosslinked polyolefin resin foams obtained therefrom had no occurrence of wrinkles in secondary processing with excellent molding properties as well as excellent flexibility.

In contrast, the crosslinked polyolefin resin foams obtained in Comparative Examples 1 to 3 contained no olefin rubber or had a compressive strength ratio of more than 4.5, so that no improvement in the molding properties was achieved resulting from the worsened flexibility or the occurrence of wrinkles in secondary processing.

The invention claimed is:

1. A crosslinked polyolefin resin foam obtained by crosslinking and foaming a polyolefin resin composition comprising an ethylene-propylene random copolymer and an olefin rubber,
   the olefin rubber comprising an ethylene-propylene-diene copolymer and a thermoplastic olefin elastomer,
   the ethylene-propylene-diene copolymer having a Mooney viscosity (ML$_{1+4}$, 100° C.) of 15 to 85,
   the ethylene-propylene-diene copolymer being contained in an amount of 33.3 to 60 parts by mass relative to 100 parts by mass of the ethylene-propylene random copolymer,
   the thermoplastic olefin elastomer being contained in an amount of 33.3 to 40 parts by mass relative to 100 parts by mass of the ethylene-propylene random copolymer, and
   the foam having a 25% compressive hardness of 30 to 70 kPa and a compressive strength ratio, 25% compressive strength/ 5% compressive strength, of 2.0 to 4.5, wherein the crosslinking degree of the whole polyolefin resin foam is 30 to 65%.

2. A molded product obtained by molding the crosslinked polyolefin resin foam according to claim 1.

3. The molded product according to claim 2, having a skin material laminated on the crosslinked polyolefin resin foam so as to be integrated.

4. The molded product according to claim 2 for use as materials for vehicle interior.

5. The crosslinked polyolefin resin foam according to claim 1, wherein the crosslinking is performed by irradiating with an electron beam.

6. The crosslinked polyolefin resin foam according to claim 1, wherein the thermoplastic olefin elastomer has a melt flow rate of 0.8 to 5.0g/10 min.

* * * * *